(No Model.)

H. & C. KELLER.
CENTER PIN FASTENING FOR PIANO ACTIONS.

No. 487,484. Patented Dec. 6, 1892.

Witnesses.
W. D. Neilley.
Paul Dorckmann.

Inventors.
Henry Keller.
Constantine Keller.
By Andrew Wilson
Attorney.

UNITED STATES PATENT OFFICE.

HENRY KELLER AND CONSTANTINE KELLER, OF NEW YORK, N. Y.

CENTER-PIN FASTENING FOR PIANO-ACTIONS.

SPECIFICATION forming part of Letters Patent No. 487,484, dated December 6, 1892.

Application filed June 3, 1892. Serial No. 435,467. (No model.)

*To all whom it may concern:*

Be it known that we, HENRY KELLER and CONSTANTINE KELLER, of the city, county, and State of New York, have invented certain new and useful Improvements in Center-Pin Fastenings for Piano-Actions, of which the following is a specification.

Our invention relates to an improvement in the method of holding the center-pins of the movable parts of the action, so that they may be firmly grasped by the moving portions of the action, while at the same time provision is made for tightening the pin in its place when necessary in adjusting the action; and our invention relates particularly to the form of screw used to hold the center-pin.

Figure 1:
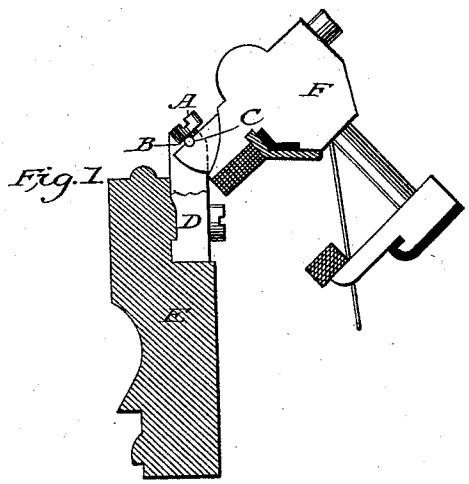
Figure 3:
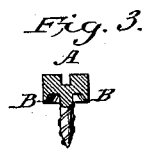
Figure 4:
Figure 5:
Figure 2:
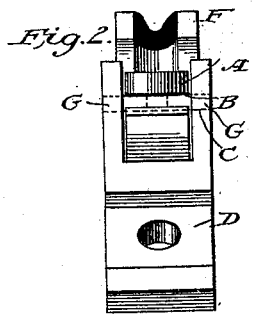

In the drawings, Figure 1 is an elevation of a portion of an action-rail, hammer-butt clamp, partly broken away, and hammer-butt, showing the position of the center-pin as held by our improved fastener. Fig. 2 is an enlarged view from in front of the hammer-butt and hammer-butt flange. Fig. 3 is a view of our improved screw, showing the head in section; and Figs. 4 and 5 are modifications of the screw.

Similar letters of reference designate similar parts in all the figures.

A is our improved screw-fastener, which is provided around the lower edge of its head with a downwardly-projecting rim B. This rim B is beveled to a sharp edge, which when the screw is screwed down over the center-pin C will cut slightly into the center-pin and hold the pin firmly, so that it cannot escape from under the head of the screw. If it is desired, this screw can be tightened. The more firmly it is screwed down the more firmly it will grasp the center-pin, preventing it from slipping out of place. If a flat under-sided headed screw were placed for this purpose, the pin would in the first place be displaced in its bushings by being pushed endwise in the direction of the rotation of the screw as the screw pressed down against it; but the sharp flange B on our improved screw prevents this, as the flange touches the center-pin at two opposite points, and the inclination of one side of the head to move the pin is counteracted by the grasp of the opposite side. Furthermore, if a screw with a flat under-sided head were used the resistance of the center-pin would tend to cant the screw in the opposite direction from the pin, so that the pin would be grasped under an upwardly-inclined surface, from which it would be very easily dislodged and which arrangement would have a constant tendency to force the center-pin out of position and away from the screw. The rim on our screw, however, grasps the pin firmly at the points of contact, and as it cuts into the pin slightly the forward edge will overlap the pin, so that any movement of the pin away from the screw will be against the downwardly-inclined surface. When a clamp or other fastening is screwed down over a center-pin resting on wood, the center-pin is gradually forced down into the wood, and this is true to such an extent that the center-pins in actions are practically forced their entire thickness into the wood during the process of adjustment, and the retaining-clamp having come in contact with the wood no further pressure can be exerted on the pin; but the sharp rim of our screw will cut into the wood and will allow for following the center-pin even after it has been forced level with the surface of the wood. This cutting-rim can be used on machine-screws as well as on wood-screws, Fig. 5, and another modification would be the use of a sharp-edged ring, through which the screw is inserted, as shown in Fig. 4.

We have shown our improved screw applied on a hammer-butt; but it can be applied equally well on other portions of the action.

Having thus described our invention, what we claim, and desire to secure by Letters Patent of the United States, is—

The combination, with a portion of a piano-action, of a screw provided on the under side of its head with a sharp downwardly-projecting rim, the center pin or pivot grasped between such sharp edge and the portion of the action, and bearings for such center-pin, substantially as and for the purposes set forth.

HENRY KELLER.
CONSTANTINE KELLER.

Witnesses:
HERBERT J. HINDES,
WM. D. NEILLEY.